(12) United States Patent
Giacobbe

(10) Patent No.: US 9,962,879 B2
(45) Date of Patent: May 8, 2018

(54) MACHINE FOR FORMING CONTAINERS MADE OF THERMOPLASTIC MATERIAL

(71) Applicant: MAGIC MP S.p.A., Carate Brianza (IT)

(72) Inventor: Ferruccio Giacobbe, Carate Biranza (IT)

(73) Assignee: MAGIC MP S.p.A.

( * ) Notice: Subject to any disclaimer, the term of this patent is extended or adjusted under 35 U.S.C. 154(b) by 795 days.

(21) Appl. No.: 14/491,021

(22) Filed: Sep. 19, 2014

(65) Prior Publication Data

US 2015/0084243 A1    Mar. 26, 2015

(51) Int. Cl.

| | |
|---|---|
| *B29C 49/06* | (2006.01) |
| *B29C 49/56* | (2006.01) |
| B29L 31/00 | (2006.01) |
| B29C 49/02 | (2006.01) |
| B29C 49/28 | (2006.01) |
| B29C 49/32 | (2006.01) |

(52) U.S. Cl.
CPC ............ *B29C 49/06* (2013.01); *B29C 49/061* (2013.01); *B29C 49/56* (2013.01); *B29C 49/064* (2013.01); *B29C 49/32* (2013.01); *B29C 2049/023* (2013.01); *B29C 2049/283* (2013.01); *B29L 2031/712* (2013.01); *B29L 2031/7158* (2013.01)

(58) Field of Classification Search
None
See application file for complete search history.

(56) References Cited

U.S. PATENT DOCUMENTS

| | | |
|---|---|---|
| 4,470,796 A | 9/1984 | Stroup et al. |
| 4,824,359 A | 4/1989 | Poehlsen |

FOREIGN PATENT DOCUMENTS

EP        1153727 A2    11/2001

*Primary Examiner* — Monica Huson
(74) *Attorney, Agent, or Firm* — Mintz Levin Cohn Ferris Glovsky and Popeo, P.C.

(57) ABSTRACT

Machine for forming containers made of thermoplastic material by blow-molding preforms obtained by means of injection/molding within the machine, for which at least one longitudinal direction for feeding of the preforms between the stations thereof is defined, said machine including: an injection unit provided with a longitudinal injector; a station for molding the preforms, comprising a mold with a predefined number of cavities for injection/molding of preforms; a station for blowing the preforms, comprising a blowing assembly for forming finished containers; said blowing assembly comprising a smaller number of blowing cavities than the number of injection/molding cavities in the mold and being displaceable in both senses of the longitudinal direction on fixed longitudinal guides.

22 Claims, 9 Drawing Sheets

MACHINE FOR FORMING CONTAINERS MADE OF THERMOPLASTIC MATERIAL

CROSS-REFERENCE TO RELATED APPLICATION

This application claims priority to Italian Patent Application No. MI2013A001557, filed Sep. 20, 2013, the entire contents of which are hereby expressly incorporated by reference.

FIELD

The present subject matter relates to a machine for forming containers made of thermoplastic material.

BACKGROUND

It is known in the technical sector of packaging products in liquid form, powder form and the like that there exists the need to produce thermoplastic containers suitable for this purpose.

It is also known that said containers are formed in suitable machines comprising a mould into which a predefined quantity of material is injected and then subjected to a first mechanical moulding deformation in order to obtain a so-called "preform" which, in turn, is then subjected to blowing—which may be preceded by a heat conditioning treatment—in order to arrive at the final form of the container.

It is also known that said cycle may be divided into two different steps performed on different machines (called single-stage machines) for respectively producing the "preforms" and blow-moulding said preforms in order to obtain the finished container.

Vice versa, the two production steps may be combined in a single machine called a dual-stage machine. In both cases the machines comprise an injection mould formed by two half-parts which may close and open to allow injection into the mould of the material in the softened state and the subsequent extraction of the preforms, already cooled; subsequent forming of the container is performed in a second blowing mould downstream of the injection mould.

SUMMARY

In some aspects, the present subject matter can include a machine for forming containers made of thermoplastic material and/or can include a method for forming containers made of thermoplastic material.

According to a first aspect, the present subject matter relates to a machine for forming containers made of thermoplastic material by blow-moulding preforms obtained by means of injection/moulding within the machine, for which at least one longitudinal direction for feeding of the preforms between the stations thereof is defined, said machine including:
  an injection unit provided with a longitudinal injector;
  a station for moulding the preforms, including a mould with a predefined number of cavities for injection/moulding of preforms;
  a station for blowing the preforms, including a blowing assembly for forming finished containers;
  the blowing assembly including a smaller number of blowing cavities than the number of injection/moulding cavities in the mould and in some aspects being displaceable in both senses of the longitudinal direction on fixed longitudinal guides.

In some implementations, the movable blowing assembly moves from a first blowing position, where it forms a first series of containers into at least one second blowing position where it forms a second series of containers; and into a third end-of-travel position in the longitudinal direction for allowing movement of the containers towards a following unloading point.

The blowing assembly may further include a blowing mould with a number of blowing cavities equal to a whole submultiple ≥2 (greater than or equal to two) of the number of cavities in the mould of the station for moulding the preforms.

In some implementations, the number of blowing positions of the movable blowing unit corresponds to said whole submultiple ≥2 of the number of cavities in the mould of the station for moulding the preforms.

The blowing assembly displaceable in the longitudinal direction and the blowing moulds realized with a number of cavities that is smaller and preferably a whole submultiple ≥2 of the number of cavities of the injection mould, make it possible to provide a machine for forming containers made of thermoplastic material with blowing of preforms with a high production output, resulting moreover in a significant reduction in production costs since the manufacture of small-size blowing moulds is much more economical than the manufacture of a single mould of equivalent capacity.

In addition, by means of the blowing assembly displaceable between the various positions determined by subdividing the blowing moulds with respect to the injection mould, it can be possible to vary very rapidly the number of positions of the blowing mould upon variation in the format and number of containers to be formed and therefore of the moulds, reducing the downtime of the machine and ensuring optimal cooling times.

According to an example embodiment, the blowing assembly can be moved in the longitudinal direction by an actuating unit including a gear motor which drives a pinion meshing with a longitudinal rack. Such solution can result in a great versatility and ease of moving the blowing unit.

In some implementations, the machine can include a control and operating unit for controlling the movements and operating cycles of the machine.

In some implementations the control and operating unit can be designed to vary the number of blowing positions and/or the longitudinal alignment between blowing mould and preforms in the blowing positions.

According to some embodiments, the blowing assembly can include:
  an upper blowing unit displaceable in both senses of the vertical direction from a top rest position to a bottom blowing position; and
  a lower unit carrying the blowing mould.

In some implementations, said blowing mould can include two half-moulds, which are movable so as to open/close in both senses of the transverse direction for causing symmetrical closing/opening thereof towards/from a direction for centering of the half-moulds with respect to the preforms to be formed.

According to some embodiments, the means for actuating the two half-moulds of the blowing mould can be moved by actuating means including a fixed electric motor, the shaft of which is parallel to the longitudinal direction and drives a kinematic chain comprising:
  a cam keyed onto the shaft of the electric motor;

a first linkage; and a second linkage;

a first end of each of which can be hinged with a respective end of the cam, the other end of each linkage being hinged with a first end of a respective first and second rocker arm, the other end of which can be hinged with the respective half-mould by means of a rod.

In some implementations, each rocker arm rotates about a fixed central fulcrum between two angular end-of-travel positions respectively corresponding to an open position of the half-moulds and a closed position of the half-moulds for blowing, and vice versa.

In some implementations, in the mould closing position, the first linkage, the second linkage and the symmetrical cam reach and stop in an aligned position, parallel to the transverse direction. This can result in a position of the three elements such as to generate a transverse mechanical force which resists the forces inside the blowing mould, which tend instead to open said mould during the blowing step, and considerable energy savings.

In some implementations, a machine according to the present subject matter may include:

at least one pair of carriages for gripping and moving the preforms and the formed containers from/to the various stations of the machine; and/or a station for unloading the formed containers.

The carriages may include means for gripping by the neck the preforms and releasing the finished containers, in a number equal to said number of cavities in the mould of the station for moulding the preforms.

The carriages may further be carried on fixed rails extending along a closed polygonal path, the sides of which extend:

for outward travel in the longitudinal direction between the injection station and the blowing station and between the station for blowing and the station for unloading the formed containers, in the transverse direction between a front position and a rear position in the blowing station and, in the longitudinal direction between a rear position and a front position, where they are aligned in the transverse direction with the station for forming the preforms, but upstream of the latter in the longitudinal direction.

During the moulding and/or blowing step, the carriages can be arranged respectively between the male injection counter-moulds and the female injection moulds and/or between the upper blowing unit and the lower unit carrying the blowing mould. The position of the carriage in the blowing station may be fixed.

In an example embodiment, the machine can include a preform treatment station arranged in an intermediate position between the injection/moulding station and the blowing station.

The present subject matter can further relate to a method for forming containers made of thermoplastic material by blow-moulding preforms obtained by means of injection/moulding, using a single machine, there being defined a longitudinal direction of feeding of the preforms inside the machine, said method include the steps of:

injecting thermoplastic material into a mould of a moulding station with a predefined number of cavities for injection/moulding of preforms;

moulding the preforms inside the injection/moulding cavities of the mould;

blowing the preforms in a blowing station including a blowing assembly for forming finished containers;

wherein during the blowing step the blowing assembly moves in both senses of the longitudinal direction and in that it is realized with a smaller number of blowing cavities than the number of injection/blowing cavities in the mould.

In some implementations, during the blowing step, the displacement of the movable blowing assembly occurs between a first blowing position, where a first series of containers is formed, at least one second blowing position in which a further series of containers is formed, and a third end-of-travel position in the longitudinal direction for allowing movement of the containers towards the following unloading point.

In some implementations, in each blowing position of the blowing step, a number of containers equal to a whole submultiple ≥2 of the number of cavities in the mould of the station for moulding the preforms are blown.

In some implementations, the number of blowing positions of the blowing step corresponds to said whole submultiple ≥2 of the number of cavities in the mould of the station for moulding the preforms.

BRIEF DESCRIPTION OF THE DRAWINGS

Further details may be obtained from the following description of a non-limiting example of an embodiment of the present subject matter, provided with reference to the accompanying drawings, in which.

DETAILED DESCRIPTION

The dual-stage machines of the known type, although performing their intended function, nevertheless have a number of drawbacks such as the large dimensions and a limited productivity due to the slowness of opening of the moulds and the need for the preforms to remain a long time inside the injection mould in order to cool.

This long cooling time is particularly important for preforms made of PET (polyethylene terephthalate) which softens while being fed to the mould at a very high temperature and must instead be brought to temperatures that are much lower for the subsequent blowing operation.

In addition, said slowness of the cycle results in the need to increase the dimensions of the moulds in order to be able to obtain a high hourly production output, which however causes major handling difficulties, and therefore renewed slowness in the format-changing operation, as well as a significant increase in the production costs resulting from the cost of the blowing moulds, said cost increasing exponentially with the increase in their dimensions and making handling thereof difficult as a result, further increasing the downtime of the machine during the format-changing operations.

The technical problem which is posed therefore is that of providing a machine for the production of containers made of thermoplastic material, and in particular PET, by means of blowing of preforms produced by means of moulding within the same machine, which must allow correct cooling of the preforms before they undergo blowing and at the same time a high hourly production output.

In connection with this problem, the machine can allow rapid format-changing of the blowing moulds in order to reduce the production downtime and that the moulds should have small dimensions resulting in lower costs and faster handling.

Figure 1:
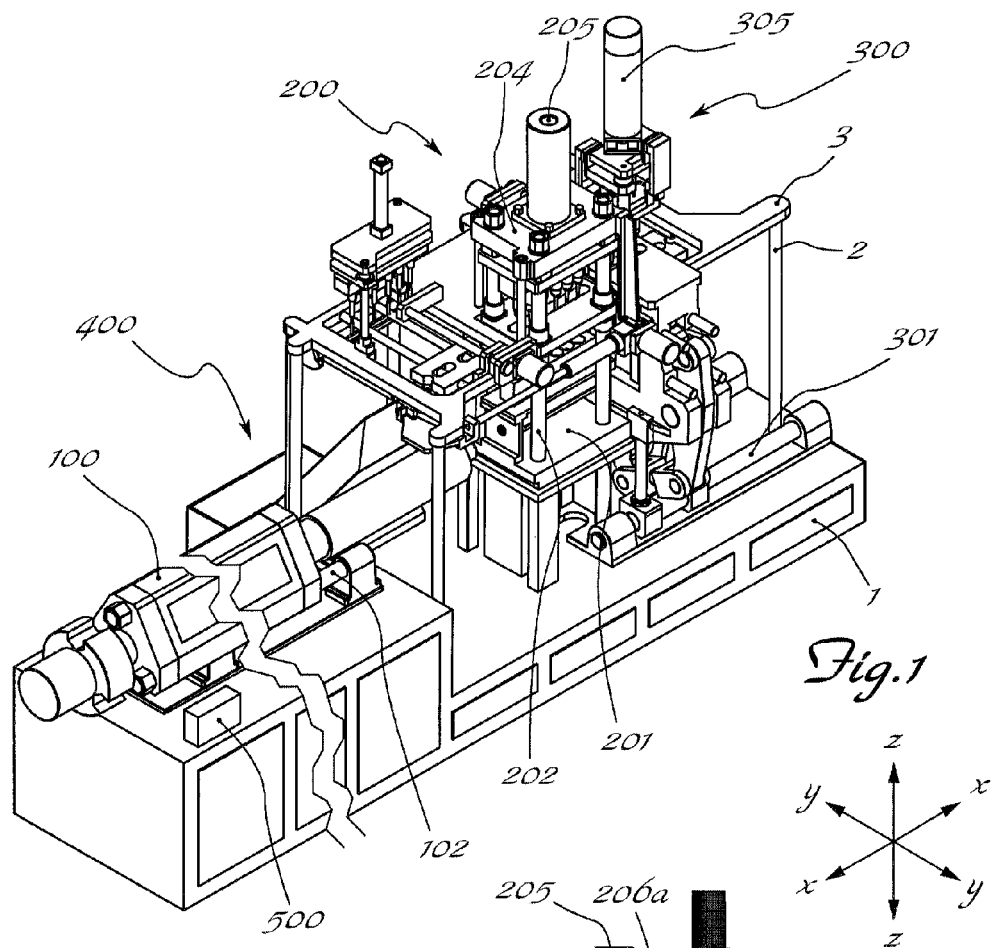
FIG. 1 shows a perspective view of the machine for forming containers according to the present subject matter.
Figure 2:
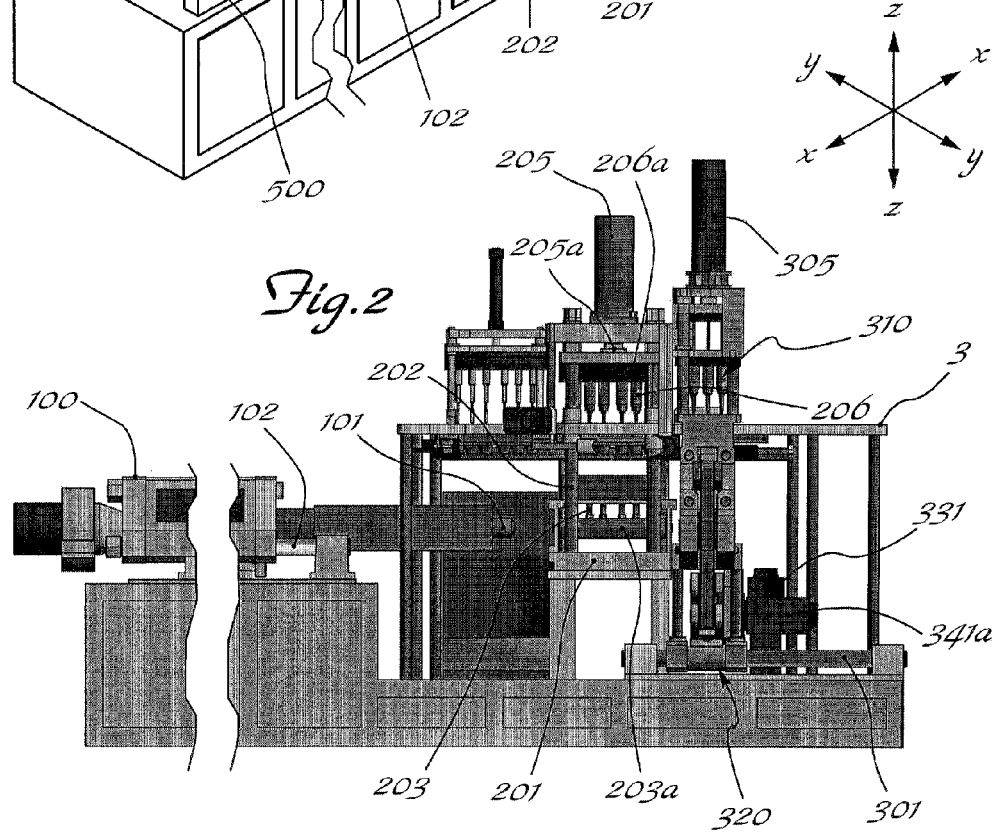
FIG. 2 shows a side view of the machine according to FIG. 1.
Figure 6A:
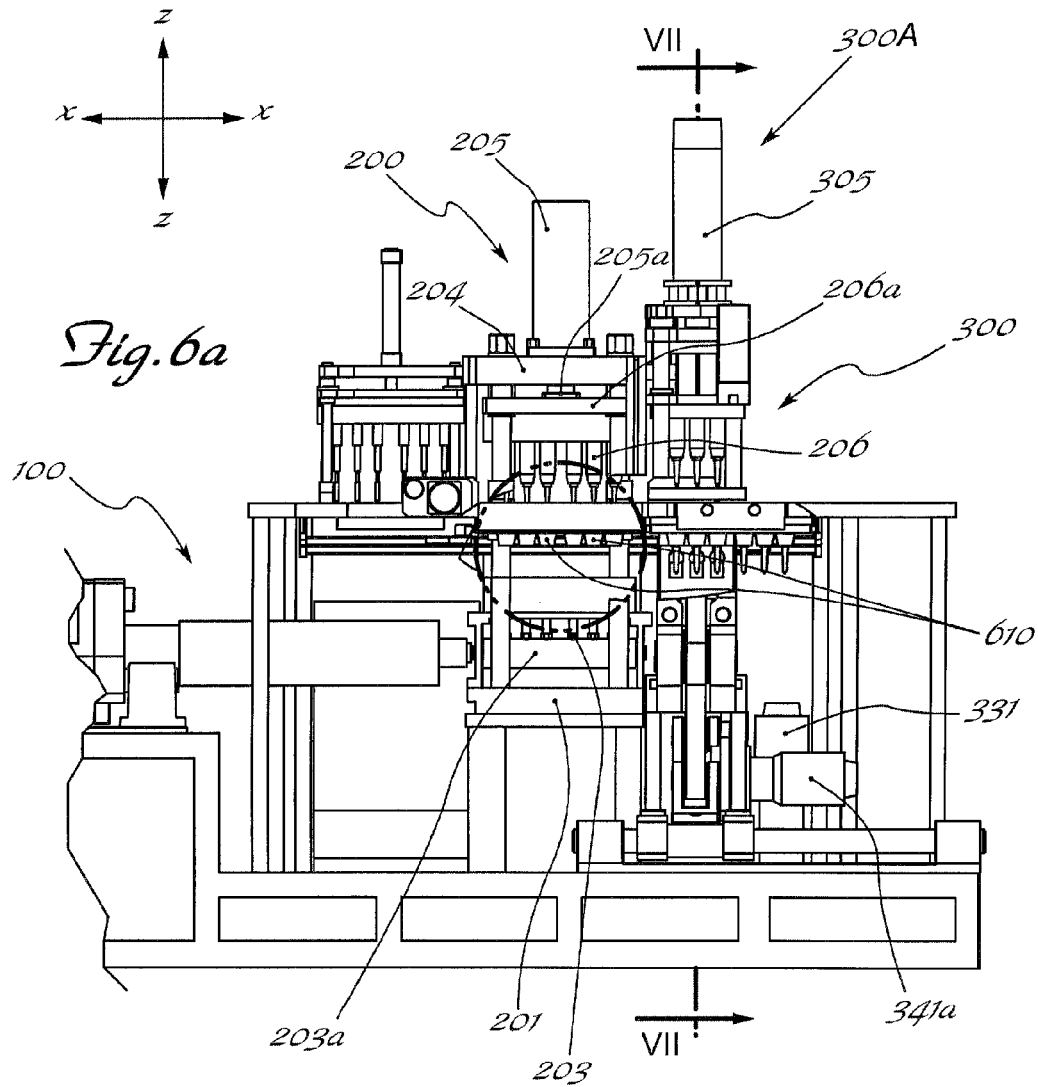
FIGS. 6a and 6b show, respectively, a lateral view and the larger scale detail of the injection mould of the machine during start of the cycle.

As shown in FIG. 1 and assuming solely for easier description, without a limiting meaning, a set of three reference axes extending in a longitudinal direction X-X, corresponding to the direction of feeding of the preforms and movement of the blowing assembly; transverse direction Y-Y perpendicular to the preceding direction and corresponding to the width of the machine, and vertical direction Z-Z, perpendicular to the other two directions and corresponding to the directions of opening/closing of the mould for forming the preforms, the container forming machine according to the present subject matter can include:

a base 1, to which vertical columns 2 are fastened, said columns having fixed to their top end a horizontal surface 3, as well as, in succession from upstream to downstream in the longitudinal direction X-X and in accordance with the working sequence:

an injection unit 100 arranged on the base 1 and provided with a longitudinal injector 101; the injection unit 100 is movable in both senses of the longitudinal direction X-X on respective guides 102 fixed to the base;

a station 200 for moulding the preforms 10a, which can include:

a corresponding base 201 to which two pairs of vertical columns 202 are fastened, said columns passing through the upper surface 3 and extending suitably beyond the same; conveniently, the columns 202 are arranged at the vertices of a polygon (FIGS. 1 and 3) with sides parallel to the longitudinal direction X-X and to the transverse direction Y-Y. A plate 203a for supporting the female moulds 203 is also fastened to the base 201, said moulds therefore being fixed;

at the top end of the columns 202 there is fixed a further plate 204 for supporting a cylinder 205 (FIG. 1), the rod 205a which is connected to a flange 206a (FIGS. 2 and 6a) carrying a plurality of male counter-moulds 206 coaxial with the female moulds 203, so that the counter-moulds 206 are able to move in both senses of the vertical direction Z-Z, so as to enter into/exit from the corresponding female moulds and therefore close/open the same simultaneously with the steps for injection/extraction of the preforms 10a;

a blowing station 300 comprising a blowing assembly which can include:

an upper blowing unit 310, displaceable in both senses of the vertical direction Z-Z from an upper rest position to a lower blowing position (upon actuation of respective means 305);

a lower unit 320 carrying the blowing mould.

Figure 3:
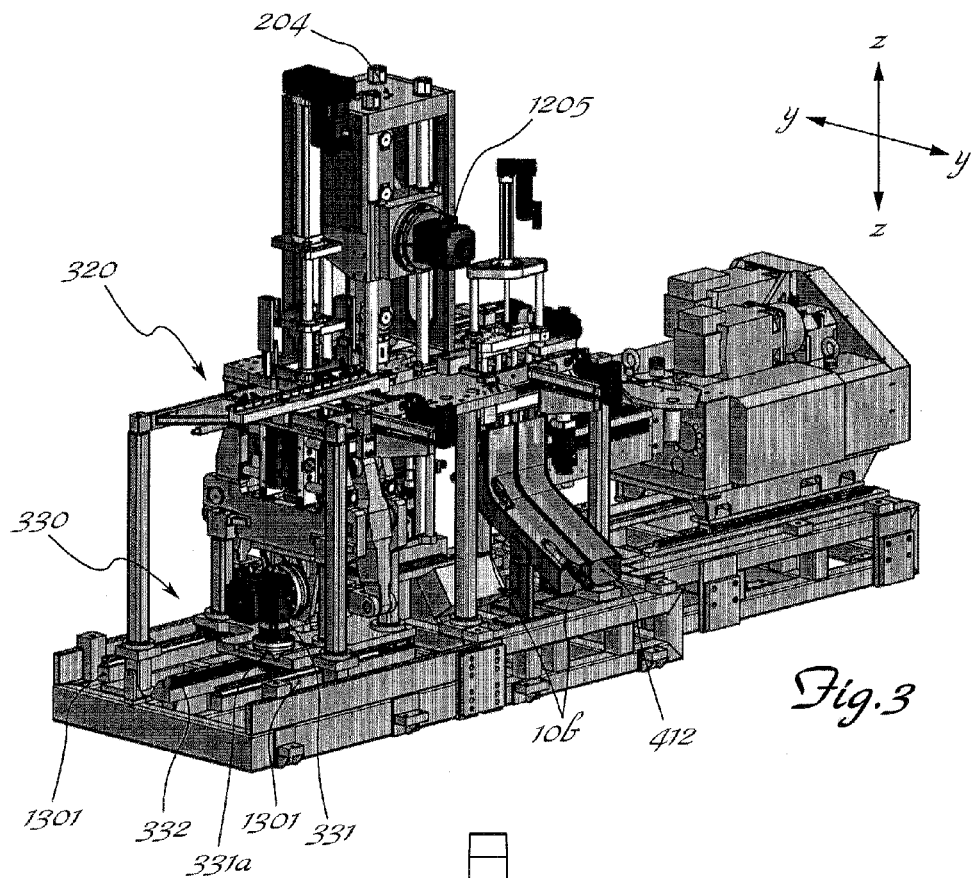
FIG. 3 shows a perspective view of the machine according to FIG. 1 with a constructional variant of the actuating unit of the injection mould.
Figure 4:
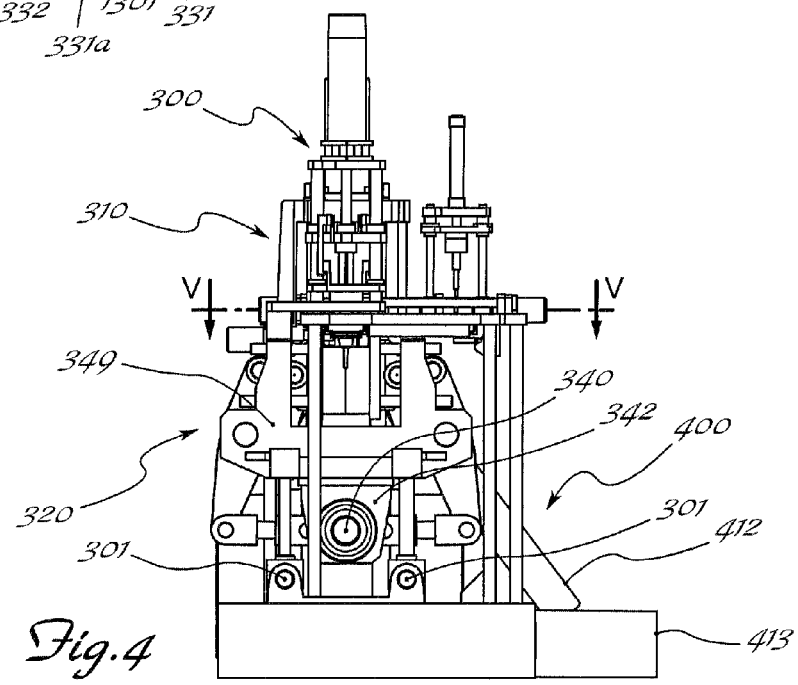
FIG. 4 shows a lateral view of the blowing station according to a variation of embodiment of the machine shown in FIG. 1.

The two units, i.e., upper unit 310 and lower unit 320, form a blowing assembly displaceable in both senses of the longitudinal direction X-X on longitudinal guides fixed to the base 1 and consisting, for example of columns 301 (FIGS. 2 and 4) or prismatic guides 1301 (FIG. 3). Said movable blowing assembly is moved by an actuating unit 330 (FIG. 3) comprising a gear motor 331 which drives a pinion 331a meshing with a longitudinal rack 332 fixed to the base 1.

Figure 10A:
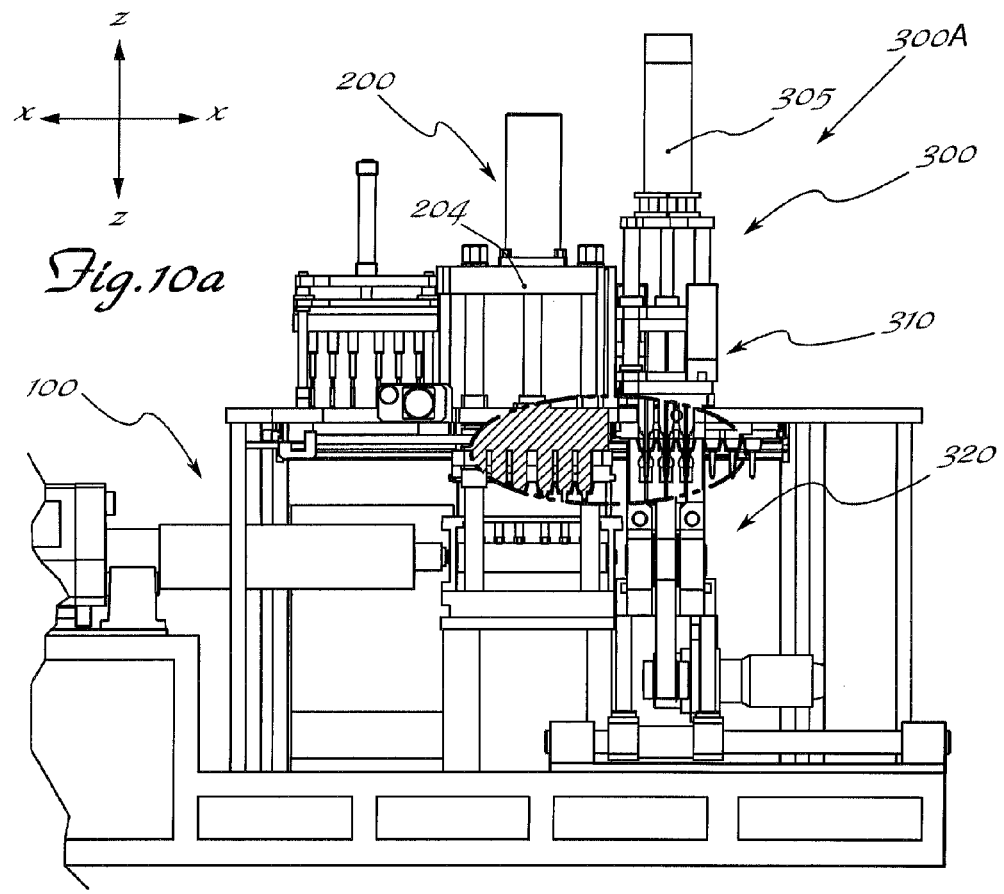
FIGS. 10a and 10b show, respectively, a lateral view of the machine according to FIG. 1 and the larger scale detail of the injection mould of the machine shown in FIG. 4, during initial blowing.
Figure 10B:
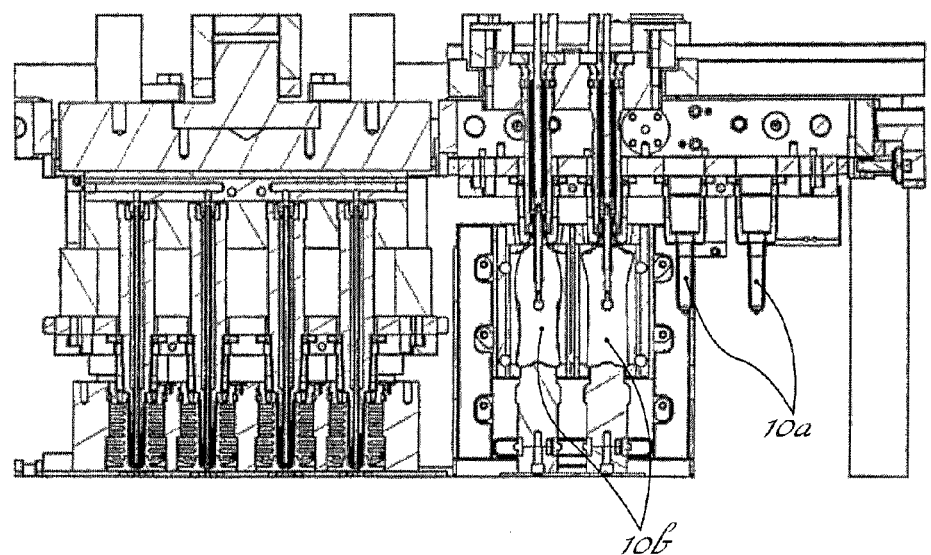
Figure 11A:
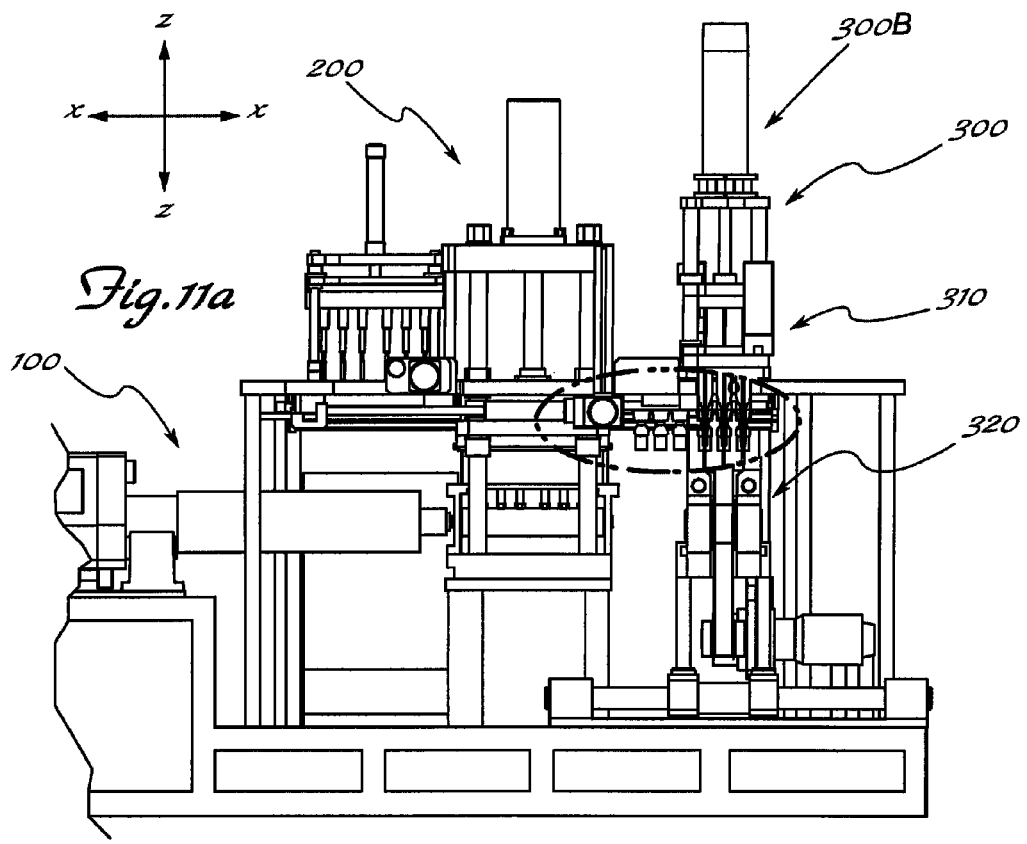
FIGS. 11a and 11b show, respectively, a lateral view of the machine according to FIG. 1 and the larger scale detail of the injection and blowing moulds of the machine shown in FIG. 4, during subsequent blowing.
Figure 11B:
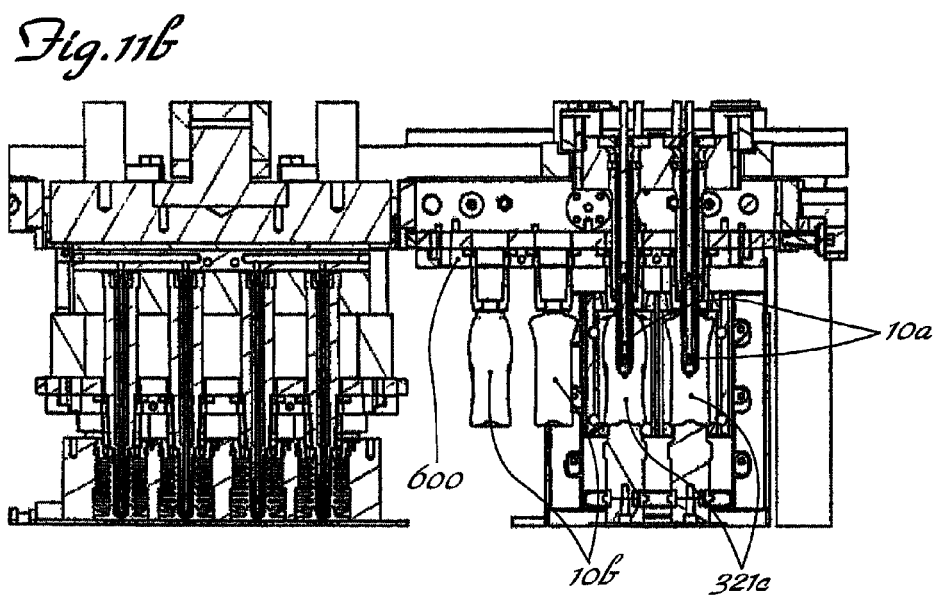
Figure 12:
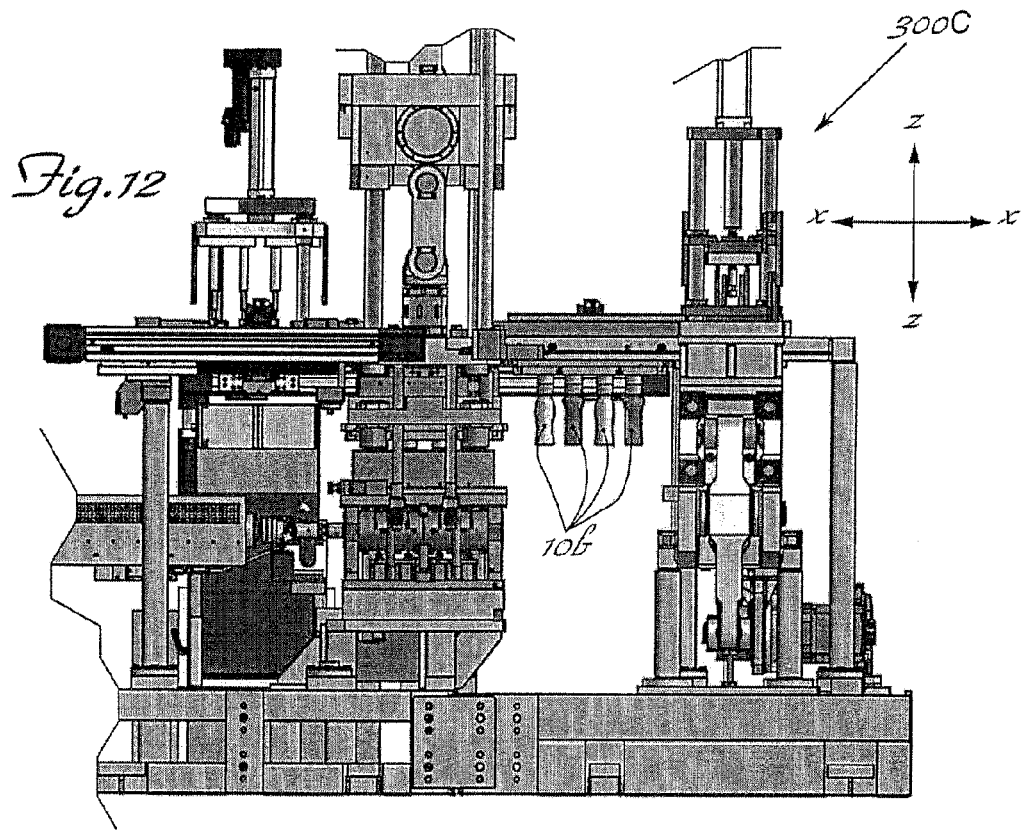
FIG. 12 shows a front lateral view of the machine according to the variant of FIG. 4 with the blowing assembly in the end-of-travel position at the end of forming.

Under the control of a control and operating unit 500 diagrammatically shown in FIG. 1, the blowing assembly is displaced in the longitudinal direction X-X within the blowing station 300 from a first blowing position 300A (FIG. 10a), which is substantially adjacent to the blowing unit 200 and where it forms a first series of containers 10b, to at least one second blowing position 300B (FIG. 11a) where it forms a second series of containers 10b; and a third end-of-travel position 300C (FIG. 12) in the longitudinal direction suitable for allowing movement of the containers 10b for subsequent unloading thereof, as will become clearer below.

In detail the movable unit 320 carrying the blowing mould can include two half-moulds 321a and 321b provided with a suitable number of blowing cavities 321c, the half-moulds being connected to means 340 for actuating them in both senses of the transverse direction Y-Y so as to cause symmetrical closing/opening towards/from a direction for centering the half-moulds 321a and 321b with respect to the preforms to be formed. The number of blowing cavities is smaller than the number of injection/moulding cavities in the mould 203. Preferably the number of blowing cavities of the two blowing half-moulds is equal to a fraction of the number of injection/forming moulds 203a of the preform injection and moulding station.

In greater detail and preferably, the number of blowing moulds of the perform blowing station 300 is a whole submultiple ≥2, preferably 2 or 3, of the number of cavities of the injection/moulding mould, the number of blowing positions (300A, 300B) of the blowing assembly corresponding to said whole submultiple. Advantageously, owing to the preferred configuration with gear motor 331 which drives the pinion 331a meshing with a longitudinal rack 332, it is possible to vary easily, by means of the control and operating unit 500, the number of different blowing positions 300A, 300B, allowing rapid changes of the format and ensuring greater versatility of the entire machine, due also to the smaller number of blowing cavities in the moulds.

As a result, it is possible to vary the alignment, in the different blowing positions, between the blowing mould and the preforms, this being necessary in particular in the case of a change in format from containers, which are symmetrical relative to the neck to containers which are asymmetrical relative to the neck, where a different cavity-preform alignment is required. It is convenient if the first blowing position 300A is the position closest to the preform moulding station 200 and the disengaging position 300C is the position furthest from said moulding station 200, allowing an optimized working cycle.

The means 340 for actuating the two half-moulds 321a, 321b of the blowing mould have an electric motor which is mounted on a fixed flange 342, the shaft 341a of which is parallel to the longitudinal direction X-X and drives a kinematic chain including without limitation a cam 343 keyed onto the shaft 341a of the electric motor; each end 343a of the cam 343 is provided with a respective seat 343b for insertion of a pin 344 for hinging, respectively, a first end of a first linkage 345 and a first end of a second linkage 346; the other end of each linkage 345, 346 being hinged by means of an associated pin 345c, 346c with a first end 347a of a respective rocker arm 347, the other end 347b of which is hinged by means of a rod 348 with the respective half-mould 321a, 321b.

As illustrated, the rocker arm rotates between two angular end-of-travel positions corresponding respectively to a position where the half-moulds are open and a position where the two half-moulds 321a, 321b are closed for blowing; rotation of the rocker arm 347 occurs about a fixed central pivot 347c which is mounted on a support frame 349 which also carries the guiding elements for displacement of the half-moulds from the opening position to the closing position and vice versa.

Figure 7:
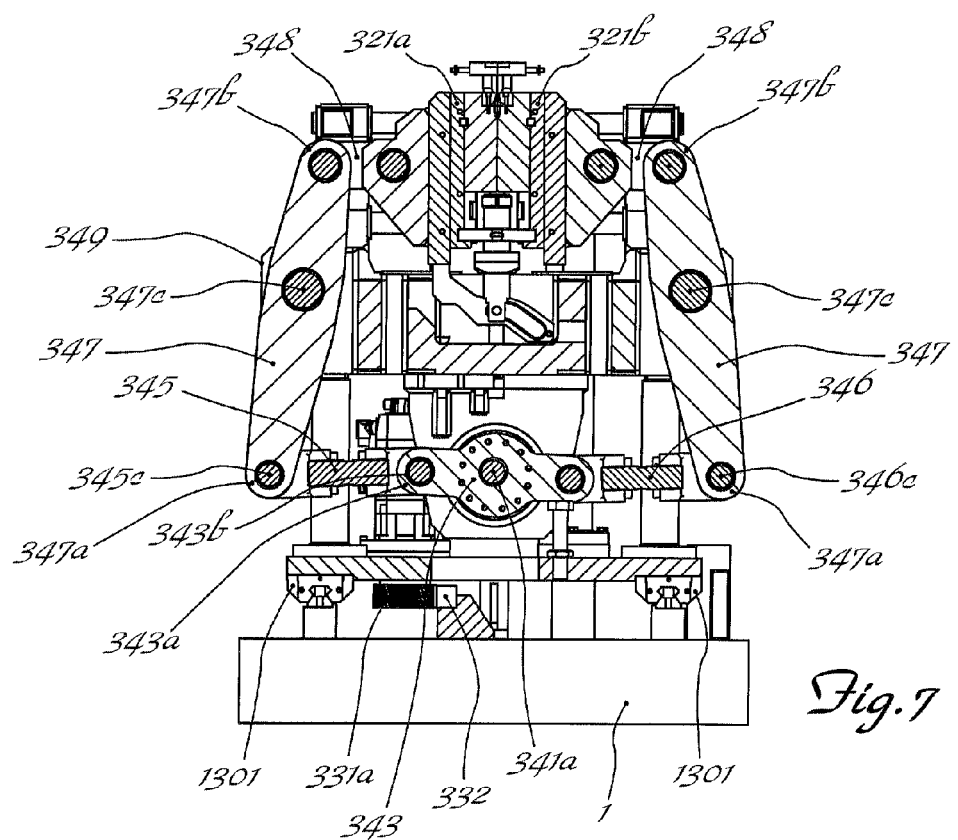
FIG. 7 shows a partial cross-section along the plane indicated by VII-VII in FIG. 6a of the device for closing the mould of the blowing station.

As shown in FIG. 7, in the mould closing position, the first linkage 345, the second linkage 346 and the symmetrical cam reach and stop in an aligned position, parallel to the transverse direction Y-Y, resulting in a position of the three elements such as to generate a transverse mechanical force which resists the forces inside the blowing mould, which tend instead to open said mould during the blowing step. The stability of the aligned position of the linkages is also assisted by end-of-travel means, which are adjustable and preferably act on the cam and are arranged parallel to the vertical direction Z-Z.

Owing to this resistive mechanical force, it is possible to substantially suspend full powering of the electric motor, which is no longer required to oppose with its torque the internal mould opening forces; this means that, for the entire duration of blowing, the motor is supplied with a smaller current designed merely to keep the cam in position.

Preferably, a station 400 for unloading the formed containers 10b completes the machine.

Figure 5:
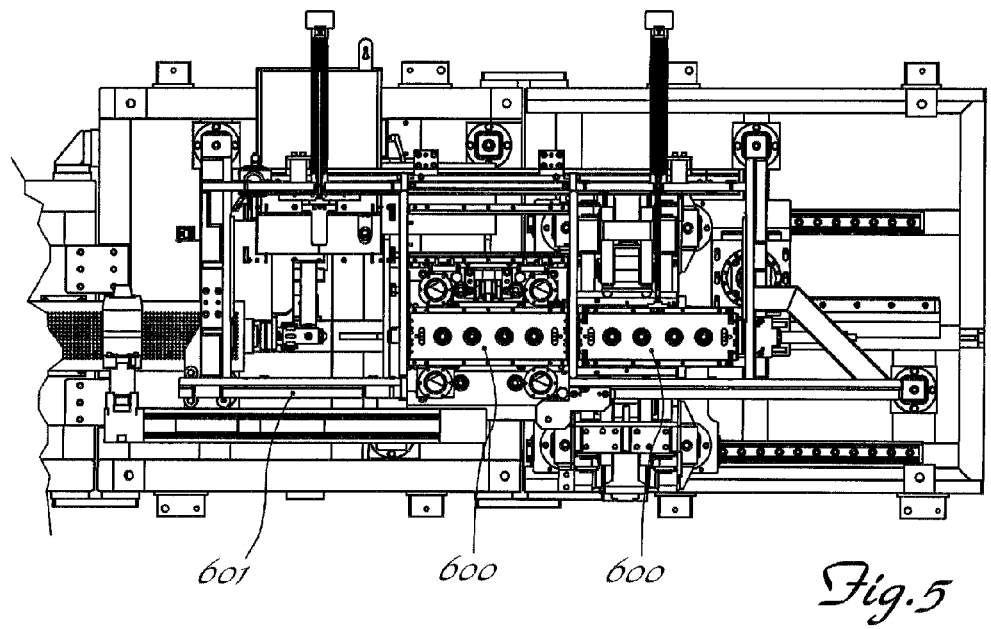
FIG. 5 shows a partial diagrammatic cross-section along the plane indicated by V-V in FIG. 4.

The machine according to the present subject matter preferably further can include at least one pair of carriages 600 (FIG. 5) for gripping and moving the preforms 10a and the formed containers 10b from/to the various stations of the machine. The carriages include means 610 for gripping and releasing the neck of the preforms and are mounted on rails 601 which are fastened to the surface 3 and extend along a closed polygonal path, the sides of which extend, for outward travel, in the longitudinal direction X-X between the injection station 100 and the blowing station 300, in the transverse direction between a front position and rear position in the blowing station 300 and, for return travel, again along the longitudinal direction X-X, between the station 300 for blowing and the station 400 for unloading the formed containers 10b, and also in the transverse direction Y-Y between a rear position and a front position in the unloading station 400 so as to allow preparation for a new machine cycle with a displacement which brings again a carriage into alignment with the preform-forming station. The number of means 610 for gripping and releasing the preforms engaged with each carriage 600 corresponds to the number of female cavities of the injection/moulding mould of the preform forming station 200.

Figure 6B:
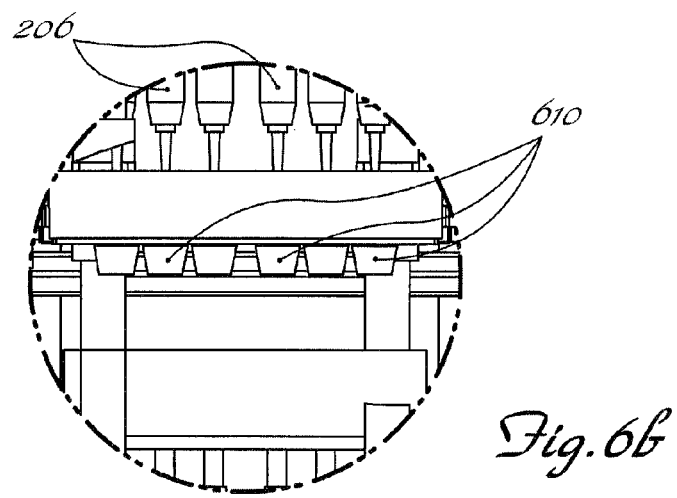
Figure 8A:
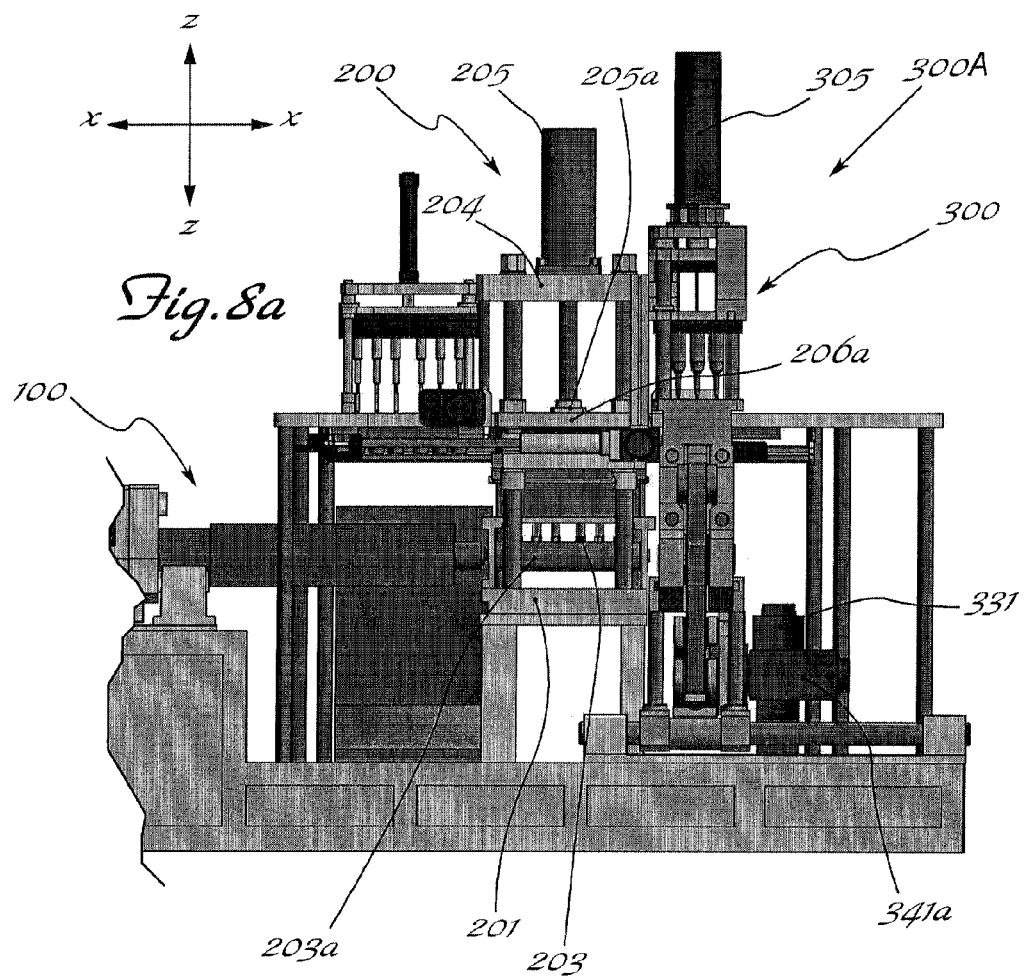
FIGS. 8a and 8b show, respectively, a lateral view of the machine according to FIG. 1 and the larger scale detail of the injection mould of the machine shown in FIG. 4, during moulding.
Figure 8B:
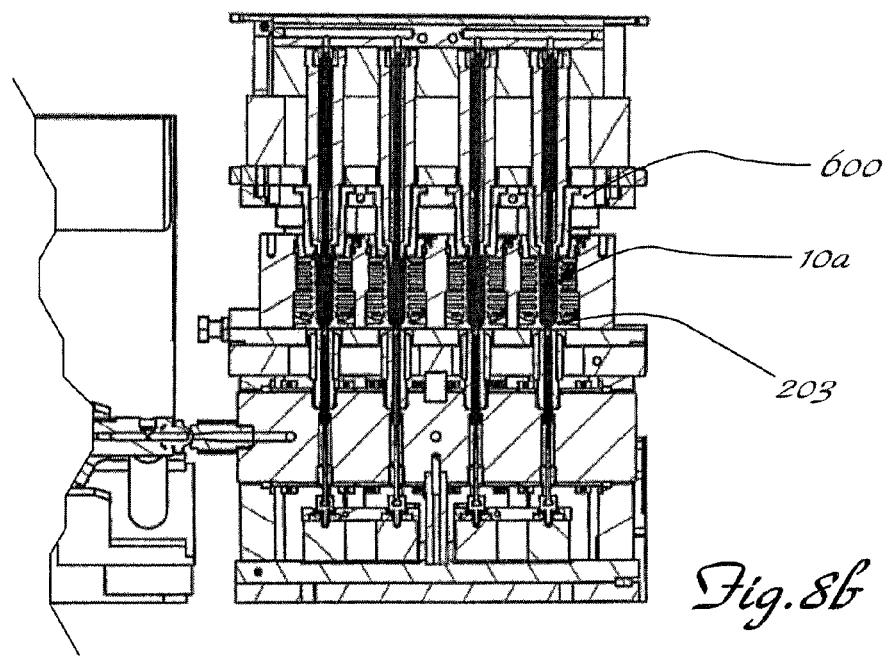
Figure 9A:
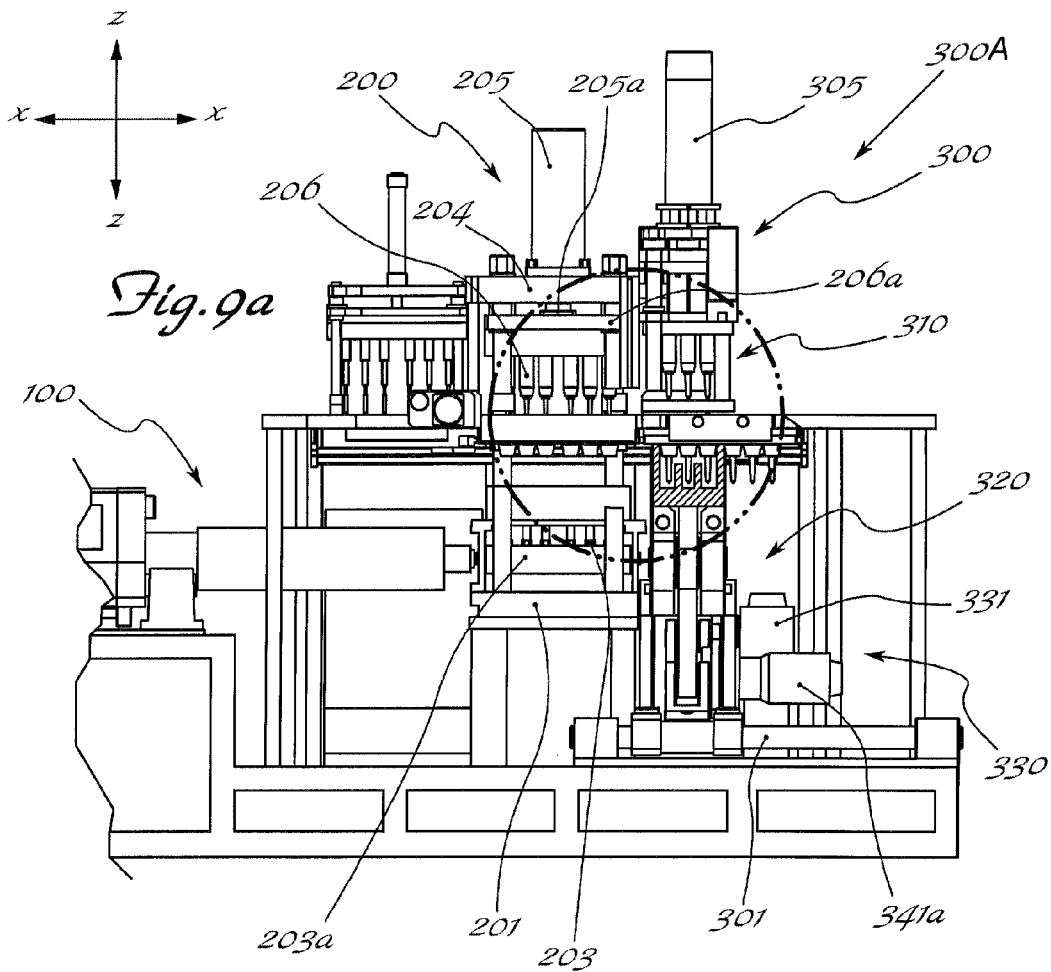
FIGS. 9a and 9b show, respectively, a lateral view and the larger scale detail of the blowing mould of the machine during the pre-blowing step.
Figure 9B:
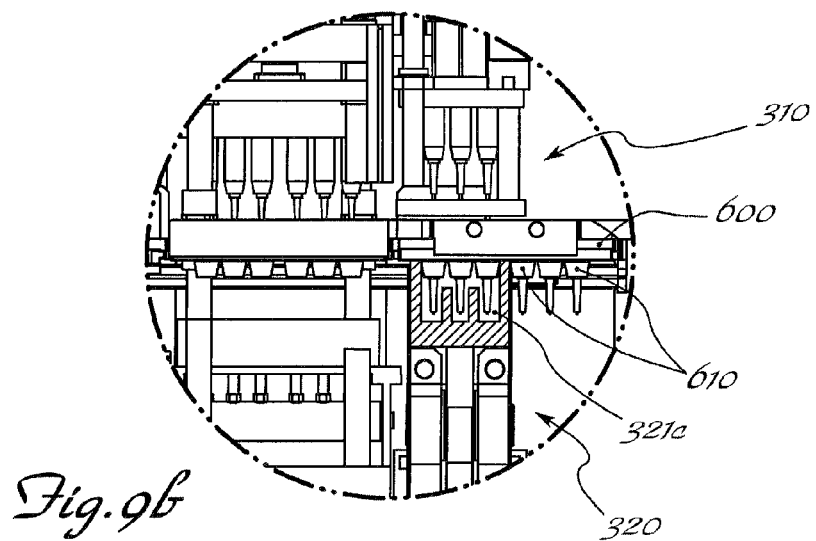
Figure 13:
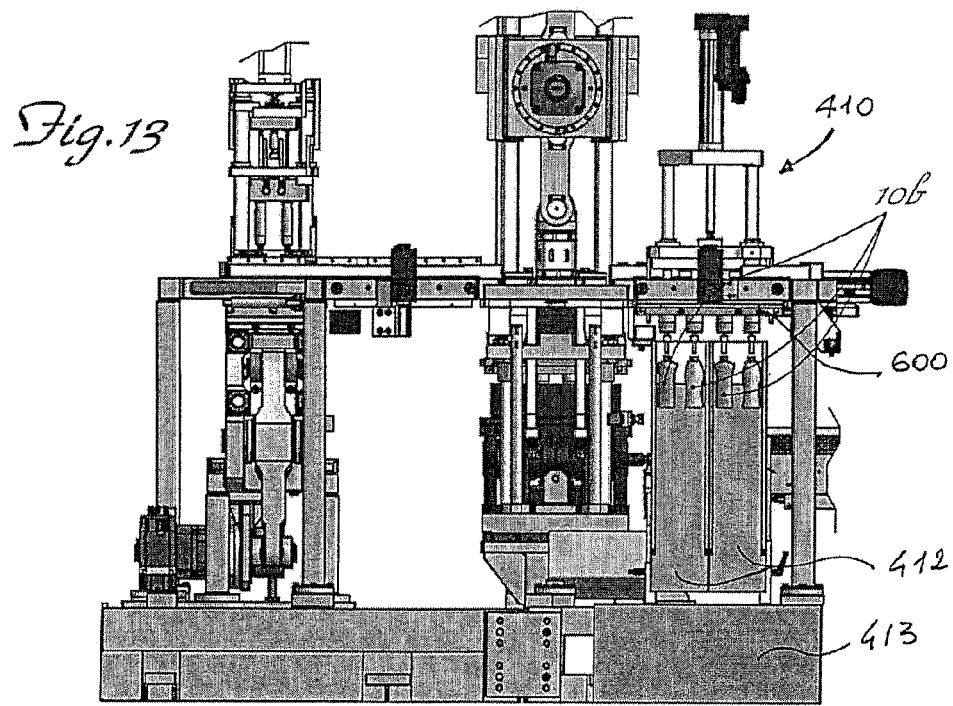
FIG. 13 shows a lateral view, from the rear, of the machine during unloading of the formed containers.

The unloading station 400 can include (FIGS. 3 and 13) means 410 acting on the vertical direction for expulsion of the formed containers 10b from the carriages 600 and means 412 with an inclined surface for guiding the falling containers 10b from the carriages 600 towards collection boxes 413 inside which the formed containers fall freely. With this configuration and assuming only two carriages 600, the operating principle of the machine is as follows: at the start of each cycle (FIGS. 6a and 6b) the machine is in the following condition:
injection unit 100 empty and at a distance from the moulding station 200,
injection mould 203,206 open,
blowing half-moulds 321a,321b open,
at least one gripping carriage 600 arranged inside the moulding station 200,
at least one gripping carriage 600 waiting in the station 300 for blowing the preforms 10a; under the control of the control and operating unit 500:
the movable unit 320 carrying the blowing moulds is moved from the third unloading position 300C to the first blowing position 300A adjacent to the station 200 for moulding the preforms 10a;
the injector 100 is loaded with the necessary quantity of PET material, the injector 101 is moved towards the fixed female moulds 203 and relative engagement is performed;
the liquid material is injected into the fixed female moulds (cavities) 203;
closing of the injection mould is performed in the vertical direction Z-Z by lowering the male counter-moulds 206;
once forming has occurred, the preforms 10a are allowed to cool;
once the most suitable temperature programmed for blowing is reached the female moulds 203 are opened, causing the male counter-moulds 206 to move back up;
the first gripping carriage 600 moves in the longitudinal direction X-X and brings the preforms 10a to the blowing station 300 (FIGS. 9a and 9b) where the movable unit carrying the blowing mould is positioned in the first blowing position 300A, for blowing a first series of preforms 10a;
the blowing mould is closed in the transverse direction Y-Y and a first series of preforms 10a are blown so that they assume the final configuration of the finished container 10b; simultaneously
the second carriage 600 moves to the station for injection of the preforms 10a;
a second quantity of material is injected into the female half-moulds 203 for renewed injection and forming of preforms 10a;
a second moulding cycle is started;
once blowing has been concluded, the movable blowing unit 320 moves into the second blowing position 300B in order to form the second series of finished containers 10b supplied from the preceding moulding step;
once the second blowing cycle has been completed the movable blowing unit 320 moves to the end position 300C, freeing the first carriage 600 which moves in the transverse direction Y-Y towards the rear part of the machine and from here in the longitudinal direction X-X towards the unloading station 400; once the station is reached it releases the containers 10b which fall onto the inclined surface 412 and from here into the collection boxes 413;

the movable blowing unit 320 is brought back into the first blowing position 300A pending arrival of the second carriage 600 which carries the second group of preforms 10a formed in the moulding station 200 and ready for blowing;

the first gripping carriage 600 is displaced in the transverse direction Y-Y and moves from the rear part of the unloading station 400 to the front part and into position inside the moulding station 200.

A person skilled in the art will have the necessary skill to determine the time intervals for the cycle and for execution of the various steps as well as subdivision of the blowing mould cavities with respect to the injection mould depending on the number of female moulds of the latter and therefore the number of preforms simultaneously formed during injection and the cooling time programmed for the said preforms before they pass from the injection mould to the blowing mould. In the case of pre-blowing treatment, or where considered appropriate, the number of carriages 600 may be increased, preferably to five carriages, optimizing the time intervals and movements, such that all the stations are as productive as possible.

It is therefore clear how, as a result of the blowing assembly displaceable in the longitudinal direction X-X and the blowing moulds realized with a number of cavities that is smaller and preferably a whole submultiple ≥2 of the number of cavities of the injection mould, it is possible to provide a machine for forming containers made of thermoplastic material with blowing of preforms obtained by means of injection in an associated station of the same machine, with a high hourly production output, resulting moreover in a significant reduction in production costs since the manufacture of small-size blowing moulds is much more economical than the manufacture of a single mould of equivalent capacity.

In addition, by means of the blowing assembly displaceable between the various positions determined by subdividing the blowing moulds with respect to the injection mould under the control of the central control and operating unit, it is possible to vary very rapidly the number of positions of the blowing mould upon variation in the format and number of containers to be formed and therefore of the moulds, reducing the downtime of the machine.

As shown in FIG. 3, it is envisaged however by way of a variant that opening/closing of the injection mould may be performed by an actuating unit comprising an electric motor 1205, with a drive shaft parallel to the direction Y-Y and perpendicular to the vertical direction Z-Z of opening/closing of the mould, and a kinematic chain (not shown) comprising a cam and double linkage forming the subject of a co-pending patent application in the name of the same present Applicant, said cam and double linkage, during closure, being arranged aligned, parallel to the vertical direction Z-Z.

Although described in relation to an example of embodiment with a blowing-mould carrying unit movable between two different blowing positions, it is envisaged that the subdivision of the blowing moulds may also be equal to a number greater than two and, therefore, the blowing positions which the movable unit may assume may be correspondingly greater, if necessary increasing also the number of gripping and transportation carriages.

As required, it is also possible to provide a preform treatment station arranged in an intermediate position between the injection and moulding station and the blowing station.

Although described in connection with a number of embodiments and a number of preferred examples of embodiment of the present subject matter, it is understood that the scope of protection of the present disclosure will be determined by any claims that may issue with respect thereto.

The invention claimed is:

1. A machine for forming containers made of thermoplastic material by blow-moulding preforms obtained by means of injection/moulding within the machine, for which at least one longitudinal direction for feeding of the preforms between stations thereof is defined, said machine comprising:

an injection unit provided with a longitudinal injector;

a moulding station for moulding the preforms, the moulding station comprising a mould with a predefined number of cavities for injection/moulding of the preforms; and a blowing station for blowing the preforms, the blowing station comprising a blowing assembly for forming the containers, wherein said blowing assembly comprises a smaller number of blowing cavities than the predefined number of the injection/moulding cavities in the mould and is displaceable in both senses of the longitudinal direction on fixed longitudinal guides.

2. The Machine according to claim 1, wherein said displaceable blowing assembly moves from a first blowing position, where it forms a first series of the containers into at least one second blowing position where it forms a second series of the containers; and into a third end-of-travel position in the longitudinal direction for allowing movement of the containers towards a following unloading point.

3. The Machine according to claim 1, wherein the blowing assembly comprises a blowing mould with the blowing cavities, wherein the number of blowing cavities is equal to a whole submultiple greater than or equal to two (≥2) of the predefined number of the injection/moulding cavities in the mould of the station for moulding the preforms.

4. The Machine according to claim 3, wherein the number of the blowing positions of the displaceable blowing assembly corresponds to said whole submultiple greater than or equal to two of the predefined number of injection/moulding cavities in the mould of the mould station for moulding the preforms.

5. The Machine according to claim 1, wherein said blowing assembly is moved in the longitudinal direction by an actuating unit comprising a gear motor which drives a pinion meshing with a longitudinal rack.

6. The Machine according to claim 1, further comprising a control and operating unit for controlling the movements and operating cycles of the machine.

7. The Machine according to claim 6, wherein said control and operating unit is designed to vary the number of the blowing positions and/or a longitudinal alignment between the blowing mould and the preforms in the blowing positions.

8. The Machine according to claim 1, wherein said blowing assembly comprises:

an upper blowing unit displaceable in both senses of a vertical direction from a top rest position to a bottom blowing position; and a lower unit carrying the blowing mould.

9. The Machine according to claim 8, wherein said blowing mould comprises two half-moulds which are movable so as to open/close in both senses of a transverse direction for causing symmetrical closing/opening thereof towards/from a direction for centering of the half-moulds with respect to the preforms to be formed.

10. The Machine according to claim 9, wherein the two half-moulds of the blowing mould are moved by actuating means comprising a fixed electric motor, with a shaft which is parallel to the longitudinal direction and drives a kinematic chain comprising:
   a cam keyed onto the shaft of the electric motor;
   a first linkage; and
   a second linkage,
   wherein a first end of each linkage is hinged with a respective end of the cam, the other end of each of the linkages being hinged with a first end of a respective first and second rocker arm, the other end of which is hinged with the respective half-mould by means of a rod.

11. The Machine according to claim 10, wherein each of the rocker arms rotates about a fixed central fulcrum between two angular end-of-travel positions respectively corresponding to an open position of the half-moulds and a closed position of the half-moulds for blowing, and vice versa.

12. The Machine according to claim 10, wherein, in the mould closing position, the first linkage, the second linkage and the cam reach and stop in an aligned position, parallel to the transverse direction.

13. The Machine according to claim 1, further comprising:
   at least one pair of carriages for gripping and moving the preforms and the containers from/to the various stations of the machine; and
   a station for unloading the formed containers.

14. The Machine according to claim 13, wherein the carriages comprise means for gripping by a neck of the preforms and releasing the finished containers, in a number equal to said predefined number of injection/moulding cavities in the mould of the station for moulding the preforms.

15. The Machine according to claim 13, wherein the carriages are mounted on fixed rails extending along a closed polygonal path with sides which extend:
   for outward travel in the longitudinal direction between the injection station and the blowing station and between the station for blowing and the station for unloading the containers, in the transverse direction between a front position and a rear position in the blowing station and,
   in the longitudinal direction between a rear position and a front position, where they are aligned in the transverse direction with the station for forming the preforms, but upstream of the latter in the longitudinal direction.

16. The Machine according to claim 14, wherein, during the moulding and/or blowing step, the carriages are arranged respectively between a male injection counter-moulds and a female injection moulds and/or between the upper blowing unit and the lower unit carrying the blowing mould.

17. The Machine according to claim 13, wherein a position of the carriage in the blowing station is fixed.

18. The Machine according to claim 1, further comprising a preform treatment station arranged in an intermediate position between the injection/moulding station and the blowing station.

19. A Method for forming containers made of thermoplastic material by blow-moulding preforms obtained by means of injection/moulding, using a single machine, there being defined a longitudinal direction of feeding of the preforms inside the machine, said method comprising:
   injecting thermoplastic material into a mould of a moulding station with a predefined number of cavities for injection/moulding of the preforms;
   moulding the preforms inside the injection/moulding cavities of the mould; and
   blowing the preforms in a blowing station comprising a blowing assembly for forming the containers,
   wherein during the blowing step said blowing assembly moves in both senses of the longitudinal direction and in that it is realized with a smaller number of blowing cavities than the predefined number of the injection/blowing cavities in the mould.

20. The Method according to claim 19, wherein, during the blowing step, a displacement of said blowing assembly occurs between a first blowing position, where a first series of the containers is formed, at least one second blowing position in which a further series of the containers is formed, and a third end-of-travel position in the longitudinal direction for allowing movement of the containers towards a following unloading point.

21. The Machine according to claim 20, wherein in each of the blowing position of the blowing step, a number of the containers equal to a whole submultiple ≥2 of the predefined number of the injection/moulding cavities in the mould of the station for moulding the preforms are blown.

22. The Method according to claim 21, wherein the number of blowing positions of the blowing step corresponds to said whole submultiple ≥2 of the number of the injection/moulding cavities in the mould of the station for moulding the preforms.

* * * * *